(12) United States Patent
Chen

(10) Patent No.: US 7,392,882 B2
(45) Date of Patent: Jul. 1, 2008

(54) LUBRICANT GUN

(75) Inventor: Shang-Hsien Chen, Taichung Hsien (TW)

(73) Assignee: Techway Industrial Co., Ltd., Taichung (TW)

( * ) Notice: Subject to any disclaimer, the term of this patent is extended or adjusted under 35 U.S.C. 154(b) by 695 days.

(21) Appl. No.: 10/925,345

(22) Filed: Aug. 25, 2004

(65) Prior Publication Data

US 2005/0258005 A1 Nov. 24, 2005

(30) Foreign Application Priority Data

May 20, 2004 (TW) .............................. 93114235 A

(51) Int. Cl.
*F01M 11/04* (2006.01)
(52) U.S. Cl. .................................. 184/105.3; 184/105.1
(58) Field of Classification Search .............. 184/105.1, 184/105.2, 105.3, 32
See application file for complete search history.

(56) References Cited

U.S. PATENT DOCUMENTS

| | | | |
|---|---|---|---|
| 5,105,912 A | | 4/1992 | Heister |
| 5,685,462 A | * | 11/1997 | Barry .......................... 222/262 |
| 5,732,794 A | * | 3/1998 | Orlitzky ....................... 184/61 |
| 6,135,327 A | | 10/2000 | Post et al. |
| 7,004,357 B2 | * | 2/2006 | Shew .......................... 222/256 |
| 7,063,240 B1 | * | 6/2006 | Niswonger ................... 222/391 |
| 7,249,695 B2 | * | 7/2007 | Shew .......................... 222/333 |
| 7,267,198 B2 | * | 9/2007 | Cen .......................... 184/105.2 |

* cited by examiner

*Primary Examiner*—David M Fenstermacher
(74) *Attorney, Agent, or Firm*—Lowe Hauptman Ham & Berner LLP

(57) ABSTRACT

A lubricant gun includes a housing, a lubricant reservoir, a motor, a final driver, an elongate eccentric seat, a guiding shroud, and a plunger. The elongate eccentric seat is mounted within the housing, and has a first portion connected eccentrically to the final driver, and a second portion opposite to the first portion. The guiding shroud is disposed between the elongate eccentric seat and a longitudinal slide channel within the housing, and defines a guide passage aligned longitudinally with the slide channel. The plunger has a guiding portion pivotally mounted to the second portion and slidably received in the guide passage, and a pushing portion received slidably in the slide channel. The guiding portion is guided by the guide passage when the plunger is driven by the elongate eccentric seat to reciprocate the guiding portion and the pushing portion of the plunger.

10 Claims, 16 Drawing Sheets

LUBRICANT GUN

CROSS-REFERENCE TO RELATED APPLICATION

This application claims priority of Taiwanese Application No. 093114235, filed May 20, 2004, the entire disclosure of which is hereby incorporated by reference.

BACKGROUND OF THE INVENTION

1. Field of the Invention

The invention relates to a lubricant gun, more particularly to a battery-operated lubricant gun.

2. Description of the Related Art

Referring to FIGS. 1 and 2, a conventional battery-operated grease gun disclosed in U.S. Pat. No. 6,135,327 includes a housing 1, a lubricant reservoir 2, an electric motor 3, a power transmission 4, a yoke 5, and a plunger 6. The housing 1 has a motor and transmission compartment 101, a handle 102, a discharge spout 103 contained in the front portion of the motor and transmission compartment 101, and a cylindrical pump chamber 104 mounted along an axial direction and fluidly communicated with the discharge spout 103. The lubricant reservoir 2 is connected to the motor and transmission compartment 101. Lubricant can be supplied from the lubricant reservoir 2 into the cylindrical pump chamber 104. The electric motor 3 is mounted within the rear portion of the motor and transmission compartment 101. The power transmission 4 is driven by the electric motor 3, and includes a planetary gearing set 401, a final driver 402, and a drive pin 403 connected eccentrically to and disposed below the final driver 402. The yoke 5 has a cam slot 501 for sliding the drive pin 403 therethrough freely from end to end. The plunger 6 is driven by the yoke 5 to reciprocate in the pump chamber 104. The planetary gearing set 401 has a three-staged configuration, and is mounted on the final driver 402. The final driver 402 is rotatably engaged to the motor and transmission compartment 101 via a bearing 404. When the electric motor 3 is activated, the planetary gearing set 401 is rotated and transforms the output of the electric motor 3, reducing its speed as it is transmitted to the final driver 402 for causing rotation of the final driver 402. The rotation of the final driver 402 is transmitted to the yoke 5 by the drive pin 403 so as to cause the yoke 5 to slide in reciprocating movement. The sliding reciprocating movement of the yoke 5 is transmitted to the plunger 6, causing it to reciprocate through the pump chamber 104. The reciprocation of the plunger 6 enables the lubricant to be pushed through the pump chamber 104 and to be discharged through the discharge spout 103. Although the lubricant can be discharged via the reciprocating movement of the plunger 6 caused by the reciprocating movement of the yoke 5, the aforesaid grease gun has the following shortcomings:

1. Since the yoke 5 is a relatively massive block, the reciprocating movement of the yoke 5 may impose a significant impact on the housing 1, which leads to the shaking of the housing 1. Therefore, it is not easy to hold the grease gun stably.

2. Referring to FIG. 2, the yoke 5 is positioned between two opposite side walls 1012 of the motor and transmission compartment 101, and slides across a pair of sliding rails 1011. However, as mentioned above, since the yoke 5 is a relatively massive block, the reciprocating movement of the yoke 5 may produce a significant friction between the yoke 5 and the side walls 1012 as well as the sliding rails 1011, which results in an increase in the power load of the electric motor 3.

Referring to FIG. 3, in another conventional battery-operated grease gun disclosed in U.S. Pat. No. 5,105,912, a driving member 7 includes a drive wheel 701 driven by an electric motor 704, a piston 702 slidably mounted in a chamber 801 of a housing 8, and a connecting arm 703 pivotally interconnecting the drive wheel 701 and the piston 702. When the drive wheel 701 is driven, the rotation of the drive wheel 701 will cause reciprocating movement of the piston 702 in the chamber 801 via the connecting arm 703 so that the lubricant can be discharged out of the housing 8. The connecting arm 703 is relatively light in weight. Furthermore, there is no friction between the connecting arm 703 and the housing 8. Therefore, the aforesaid shortcomings attributed to the yoke 5 in the grease gun disclosed in U.S. Pat. No. 6,135,327 will not occur in the grease gun disclosed in U.S. Pat. No. 5,105,912. However, referring to FIG. 4, when the drive wheel 701 is intended to push the portion of the piston 702 exposed outside the chamber 801 back into the chamber 801, a transverse torque (L×Fx) is imposed on the piston 702, which will lead to deformation or breakage of the piston 702. The friction between the chamber 801 and piston 702 may also occur due to the tilting of the piston 702.

SUMMARY OF THE INVENTION

Therefore, the object of the present invention is to provide a lubricant gun which can overcome the aforesaid shortcomings of the prior art.

The lubricant gun according to this invention includes a housing, a lubricant reservoir, a motor, a final driver, an elongate eccentric seat, a guiding shroud, and a plunger. The housing has a discharge spout, and a longitudinal slide channel fluidly communicating with the discharge spout. The lubricant reservoir is connected to the housing, and provides a supply of lubricant into the slide channel. The motor is mounted within the housing. The final driver is rotatably mounted within the housing and is driven by the motor. The elongate eccentric seat is mounted within the housing, and has a first portion connected eccentrically to the final driver, and a second portion opposite to the first portion. The guiding shroud is disposed between the elongate eccentric seat and the slide channel within the housing, and defines a guide passage aligned longitudinally with the slide channel. The plunger has a guiding portion pivotally mounted to the second portion of the elongate eccentric seat and slidably received in and supported by the guide passage of the guiding shroud, and a pushing portion received slidably in the slide channel. The guiding portion of the plunger is guided by the guide passage of the guiding shroud when the plunger is driven by the elongate eccentric seat to reciprocate the guiding portion and the pushing portion of the plunger.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
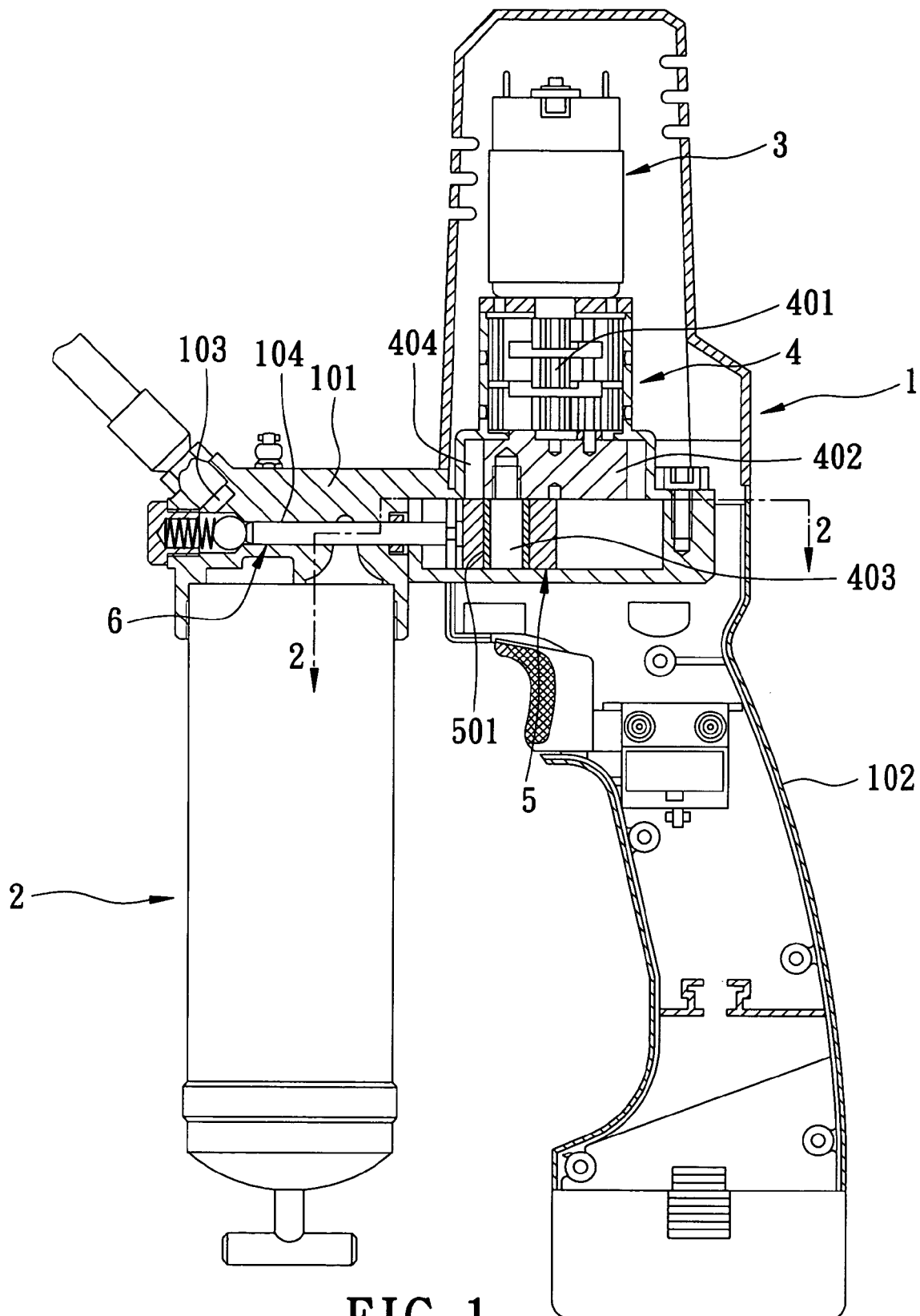
FIG. 1 is a schematic sectional view of a conventional grease gun.
Figure 2:
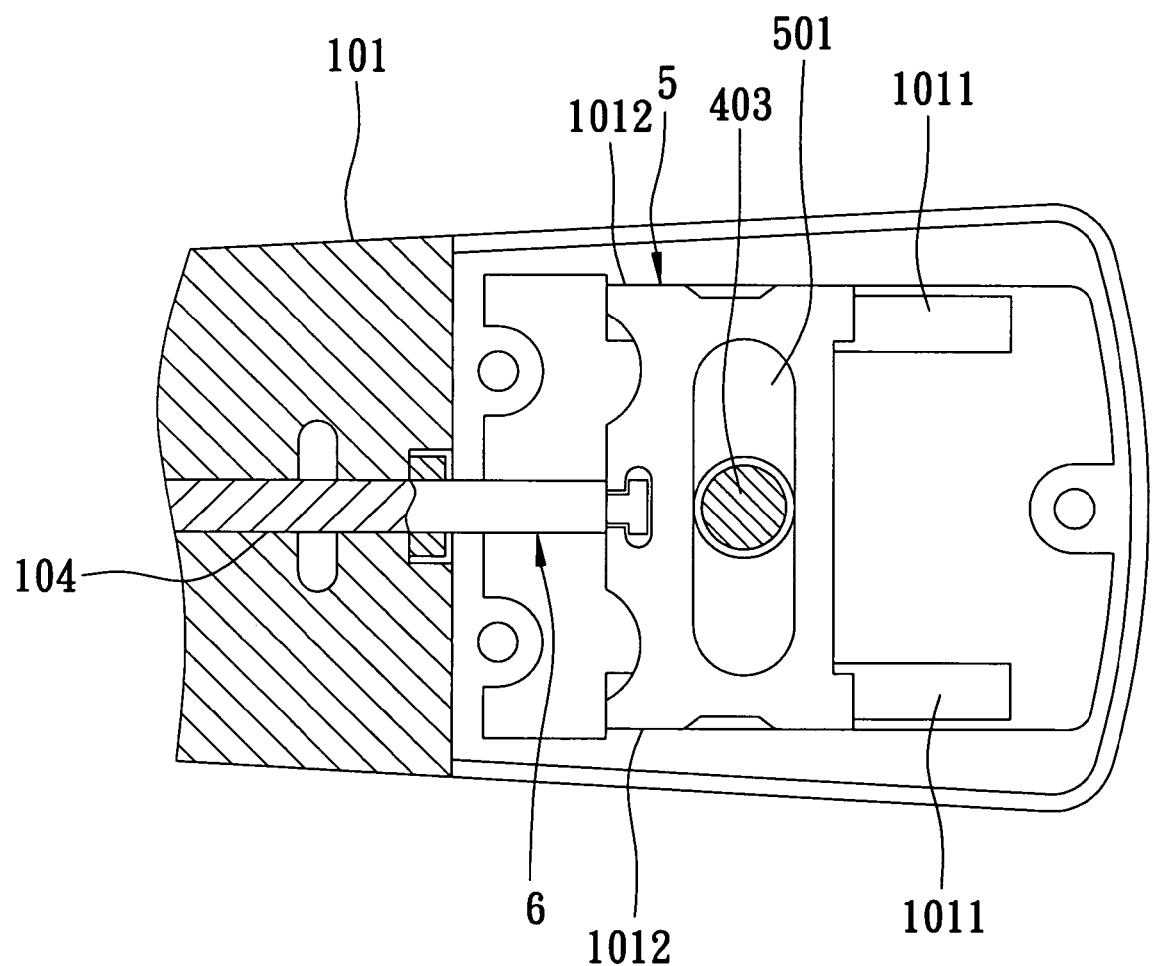
FIG. 2 is a fragmentary sectional view taken along line 2-2 of FIG. 1.
Figure 3:
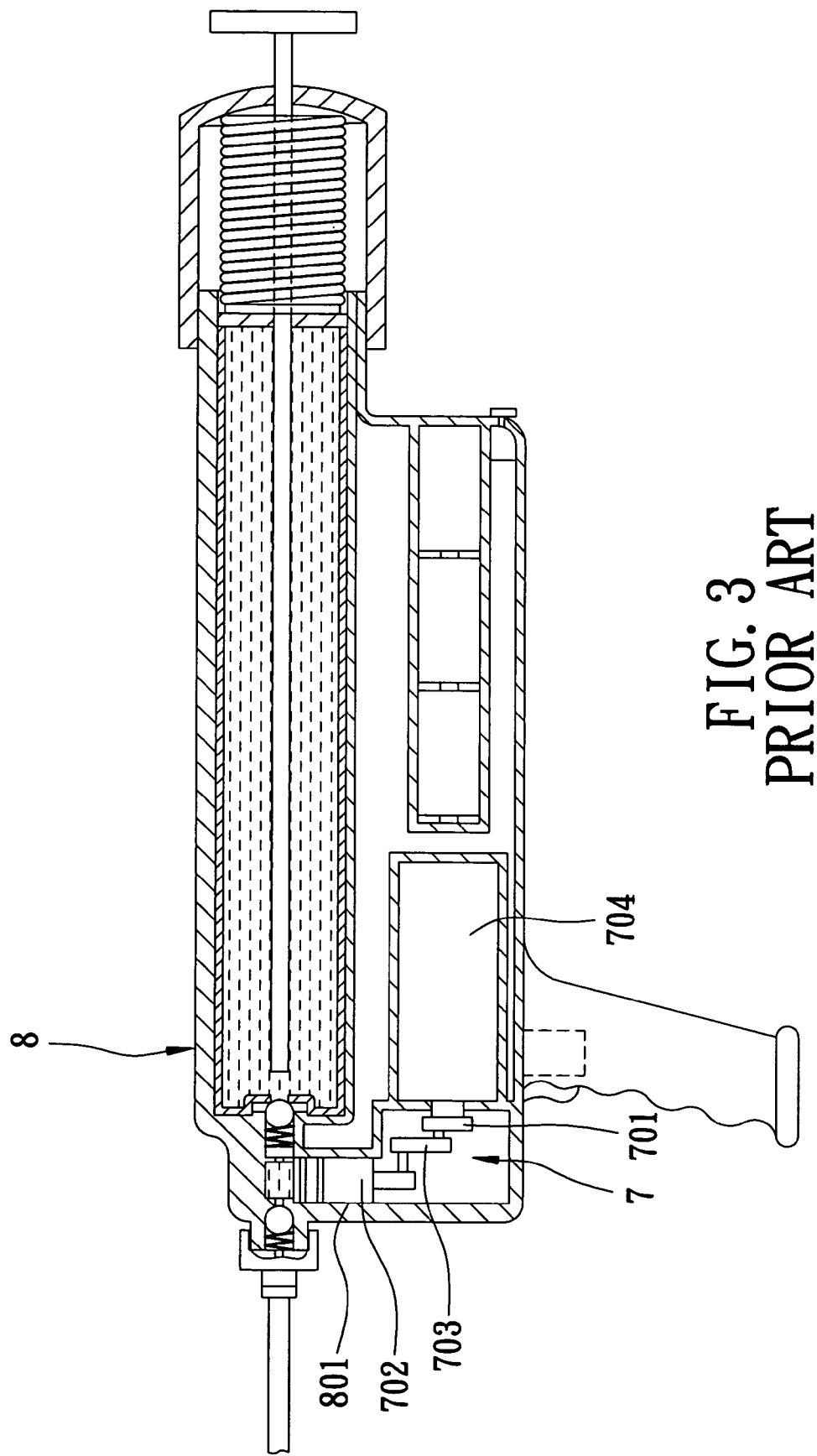
FIG. 3 is a schematic sectional view of another conventional grease gun.
Figure 4:
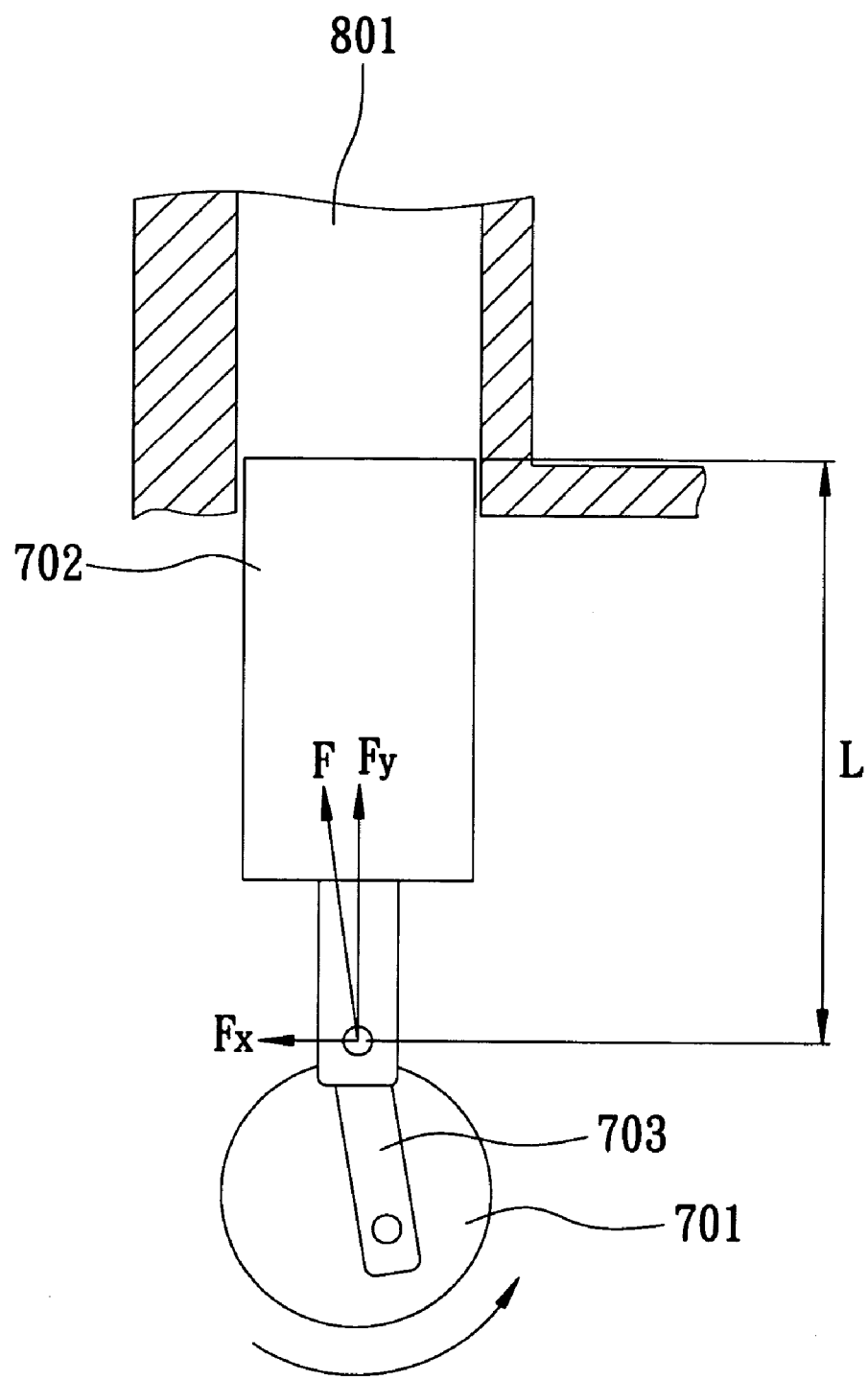
FIG. 4 is a schematic view showing a power transmission mechanism of the grease gun of FIG. 3.
Figure 5:
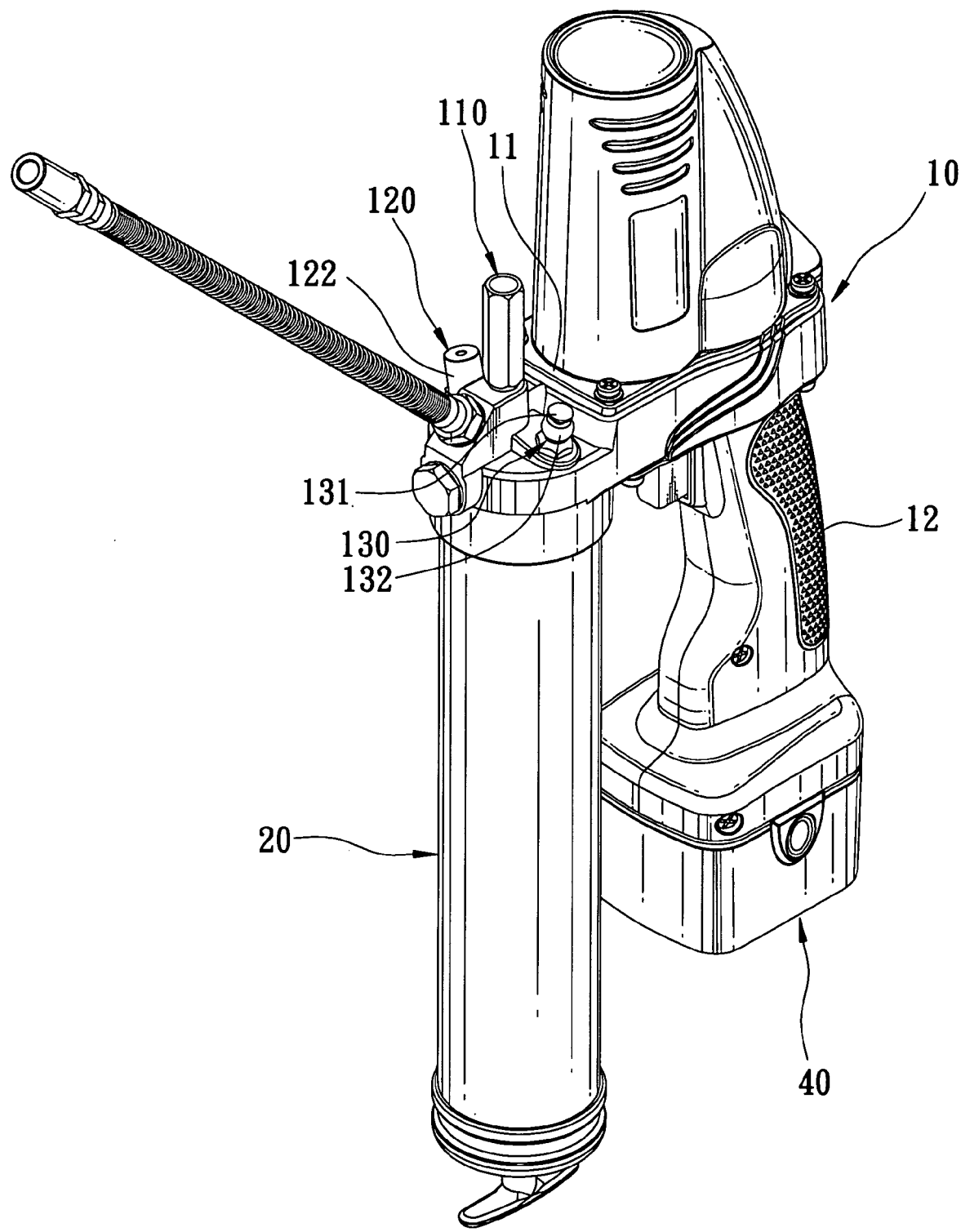
FIG. 5 is a perspective view of the preferred embodiment of a lubricant gun according to this invention.
Figure 6:
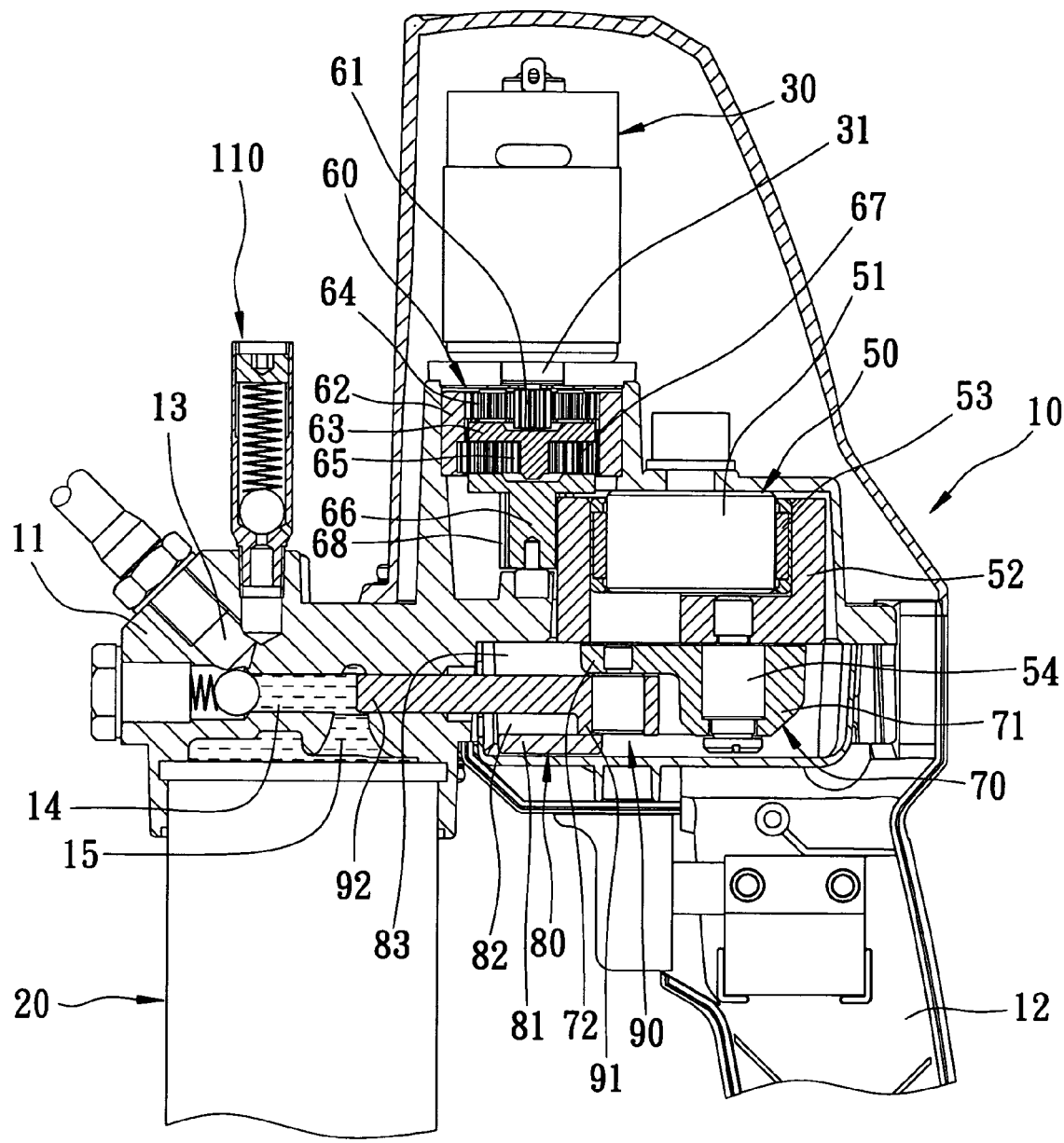
FIGS. 6-11 are fragmentary schematic sectional views showing power transmission operation in the preferred embodiment.
Figure 12:
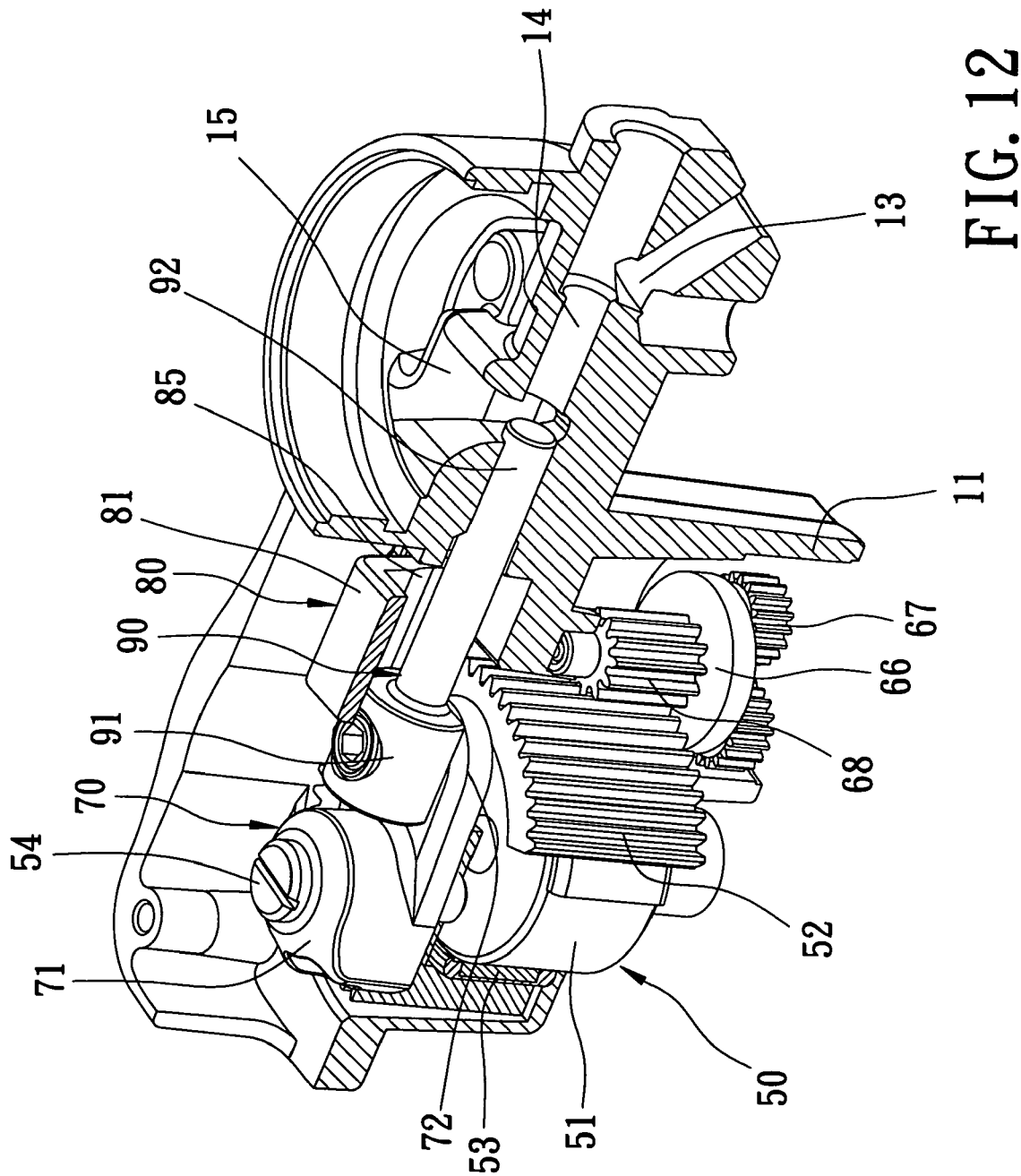
FIG. 12 is a fragmentary partly sectional perspective view of the preferred embodiment.

Referring to FIGS. 5, 6, and 12, the preferred embodiment of a lubricant gun according to this invention is shown to include a housing 10, a lubricant reservoir 20, a motor 30, a battery 40, a final driver 50, a power transmission 60, an elongate eccentric seat 70, a guiding shroud 80, a plunger 90, a safety valve 110, a lubricant inlet 120, and an exhaust valve 130.

The housing 10 has a gun compartment 11, a handle 12 connected to the gun compartment 11, a discharge spout 13 mounted on the front portion of the gun compartment 11, a longitudinal slide channel 14 formed within the gun compartment 11 and fluidly communicating with the discharge spout 13, and a lubricant supply passage 15 formed within the front portion of the gun compartment 11 and fluidly communicated with the longitudinal slide channel 14.

The lubricant reservoir 20 is connected to the housing 10, and provides a supply of lubricant into the longitudinal slide channel 14 through the lubricant supply passage 15.

The motor 30 is mounted within the rear portion of the gun compartment 11 of the housing 10 for driving the power transmission 60 to activate the final driver 50.

The battery 40 is mounted on the bottom of the handle 12, and provides the motor 30 with electric power.

The final driver 50 is rotatably mounted within the housing 10, and is driven by the motor 30. The final driver 50 has a positioning shaft 51 mounted within the rear portion of the gun compartment 11 of the housing 10, a gear member 52 surrounding the positioning shaft 51, a needle bearing 53 mounted between the positioning shaft 51 and the gear member 52, and an eccentric shaft 54 eccentrically mounted on the gear member 52.

The power transmission 60 is mounted between the motor 30 and the gear member 52 of the final driver 50. The motor 30 has an output shaft 31 extending toward the power transmission 60. The power transmission 60 includes a first sun gear 61 mounted on the output shaft 31 of the motor 30, an annular gear 62 mounted within the rear portion of the gun compartment 11, a first planet gear carrier 63, a plurality of first planet gears 64 mounted on the first planet gear carrier 63 and meshing with the first sun gear 61 and the annular gear 62 simultaneously, a second sun gear 65 mounted under the first planet gear carrier 63, a second planet gear carrier 66 pivotally mounted within the gun compartment 11 and proximate to the gear member 52, a plurality of second planet gears 67 mounted on the second planet gear carrier 66 and meshing with the second sun gear 65 and the annular gear 62, and a driving gear 68 mounted under the second planet gear carrier 66 and meshing with the gear member 52. The rotation of the motor 30 is transmitted through the power transmission 60 to rotate the gear member 52 relative to the positioning shaft 51 at a reduced speed so that the elongate eccentric seat 70 can be activated by the eccentric shaft 54.

The elongate eccentric seat 70 is mounted under the gear member 52 within the housing 10, and has a first portion 71 connected eccentrically to the eccentric shaft 54 of the final driver 50, and a second portion 72 opposite to the first portion 71. The first portion 71 of the elongate eccentric seat 70 is connected eccentrically and pivotally to the gear member 52. The elongate eccentric seat 70 is activated by the eccentric shaft 54 to move between a right dead end position shown in FIGS. 6 and 7 and a left dead end position shown in FIGS. 10 and 11.

Figure 13:
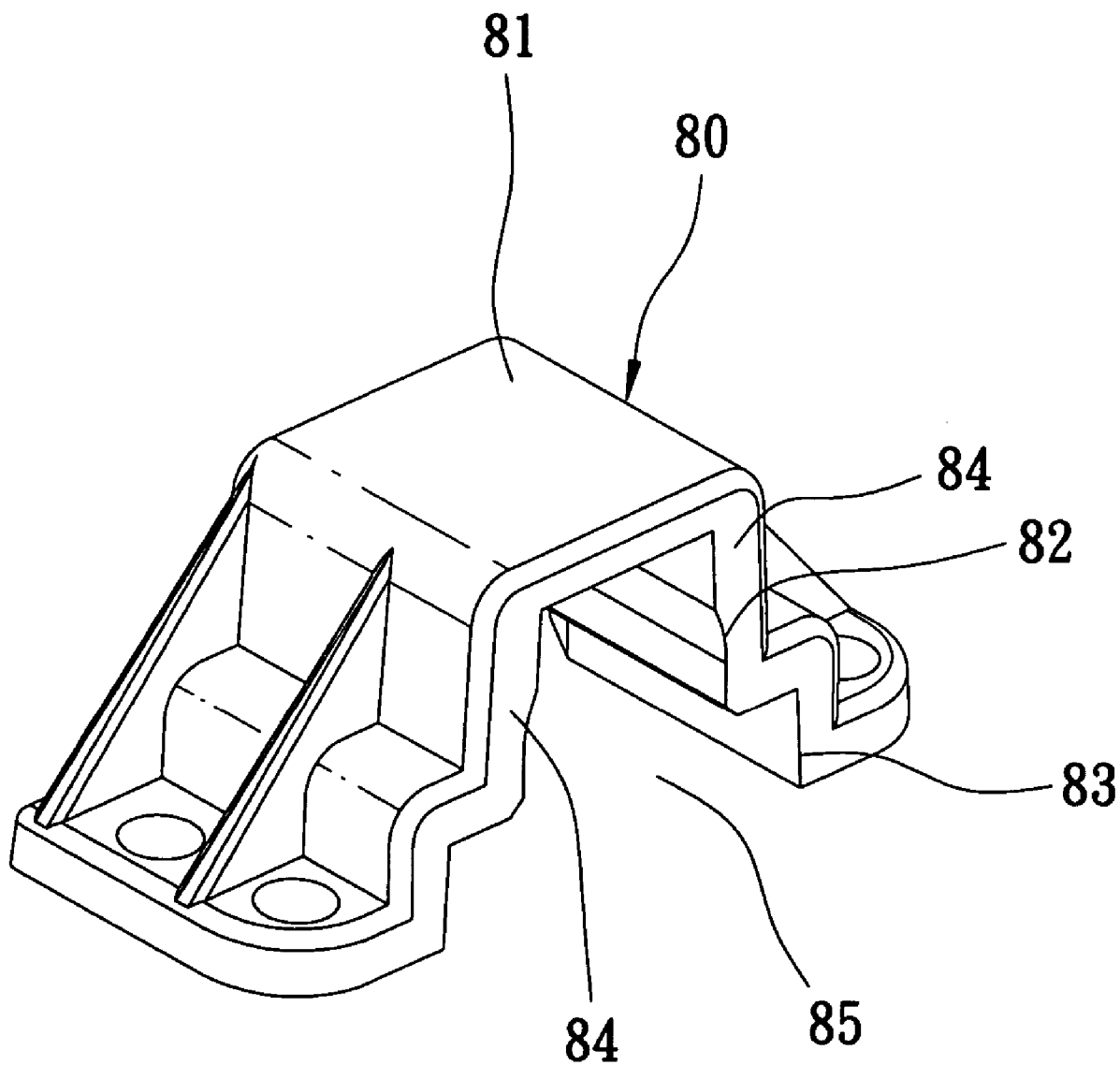
FIG. 13 is a perspective view of a guiding shroud used in the preferred embodiment.

The guiding shroud 80 is disposed between the elongate eccentric seat 70 and the slide channel 14 within the housing 10, and defines a guide passage 85 aligned longitudinally with the slide channel 14. Referring to FIG. 13, the guide passage 85 has first and second passage parts 82, 83 superimposed one upon the other. The second passage part 83 is wider than the first passage part 82. The guiding shroud 80 includes two opposite side walls 84 and a middle wall 81 interconnecting the side walls 84. The side walls 84 are stepped to define the first and second passage parts 82, 83.

Figure 7:
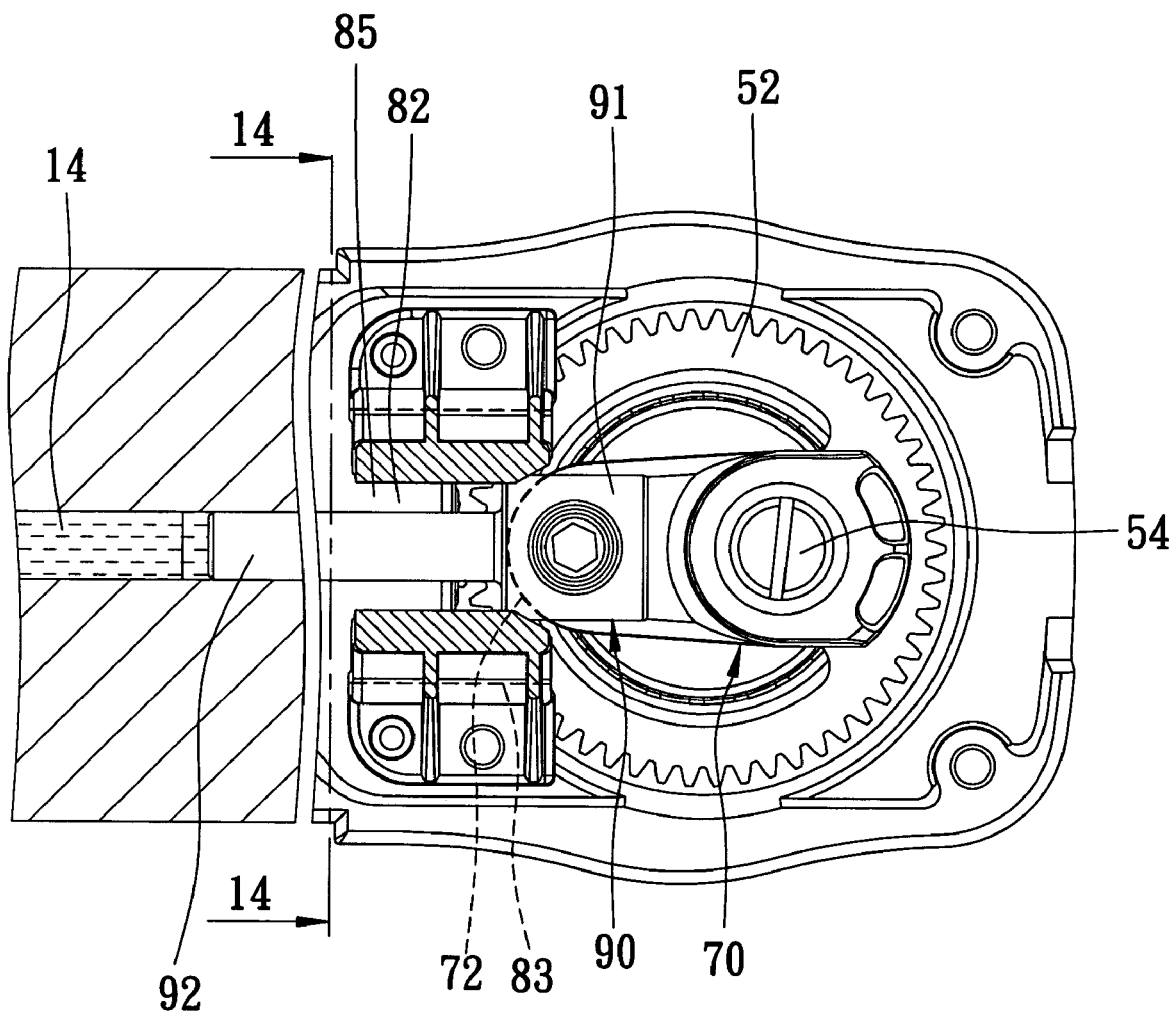
Figure 14:
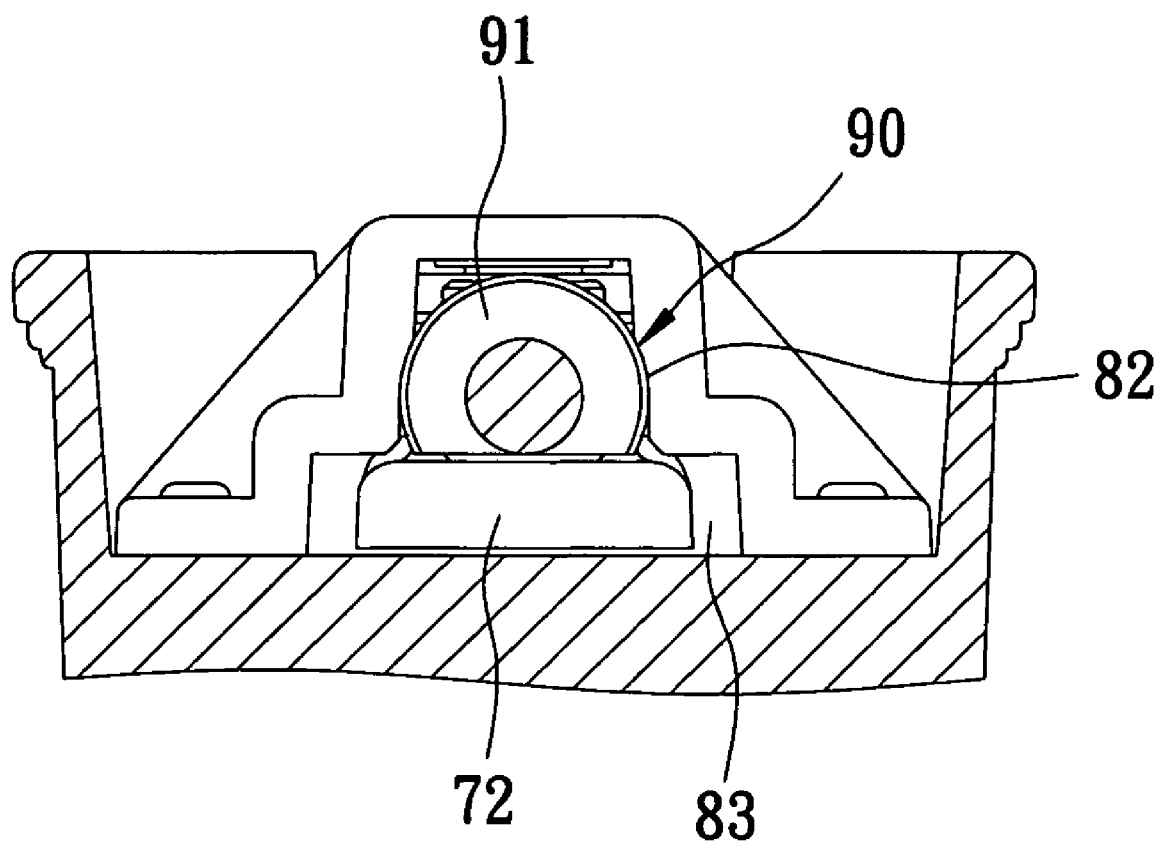
FIG. 14 is a schematic sectional view taken along line 14-14 of FIG. 7.

Referring to FIGS. 7 and 14, the plunger 90 has a guiding portion 91 pivotally mounted to the second portion 72 of the elongate eccentric seat 70 and slidably received in and supported by the first passage part 82 of the guide passage 85 of the guiding shroud 80, and a pushing portion 92 received slidably in the slide channel 14. The guiding portion 91 of the plunger 90 is guided by the first passage part 82 of the guide passage 85 of the guiding shroud 80 when the plunger 90 is driven by the elongate eccentric seat 70 to reciprocate the guiding portion 91 and the pushing portion 92 of the plunger 90.

The guiding portion 91 of the plunger 90 overlaps the second portion 72 of the elongate eccentric seat 70, and is pivoted to the second portion 72 of the elongate eccentric seat 70 where the guiding portion 91 of the plunger 90 and the second portion 72 of the elongate eccentric seat 70 overlap each other. The guide passage 85 receives and supports the overlapping portion of the second portion 72 of the elongate eccentric seat 70 and the guiding portion of the plunger 90.

The second portion 72 of the elongate eccentric seat 70 is turnable about an axis of the first portion 71 of the elongate eccentric seat 70. The first portion 71 has an axial dimension larger than a dimension of the second portion 72 along the axis of the first portion 71.

Figure 15:
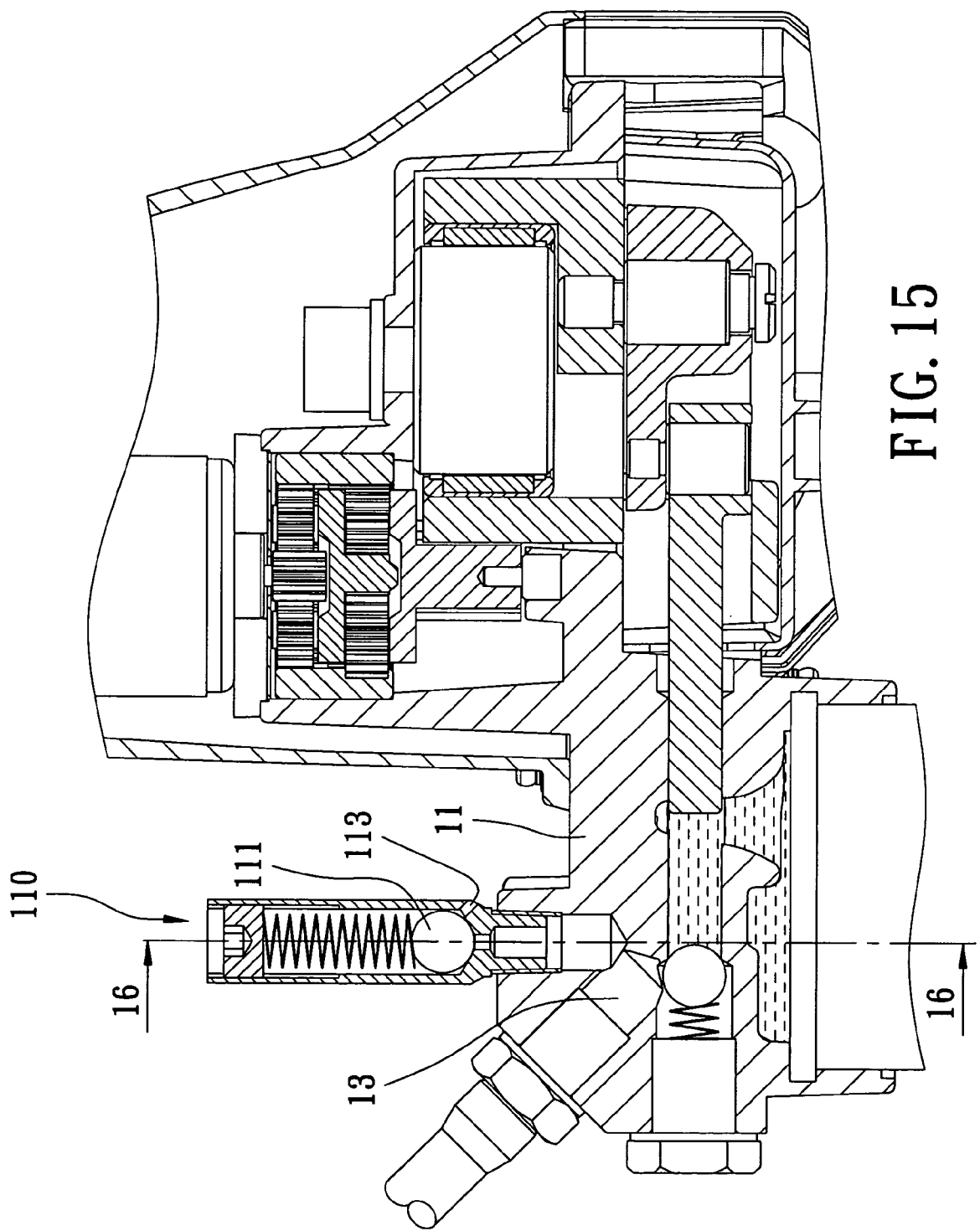
FIG. 15 is a fragmentary enlarged sectional view of FIG. 6.

Referring to FIG. 15, the safety valve 110 is mounted on the front portion of the gun compartment 11 of the housing 10, and is fluidly communicated with the discharge spout 13 so as to discharge the lubricant through a discharge hole 113 of the safety valve 110 from the discharge spout 13 by pushing a steel bead 111 upwardly when the pressure within the discharge spout 13 is above a predetermined value.

Figure 16:
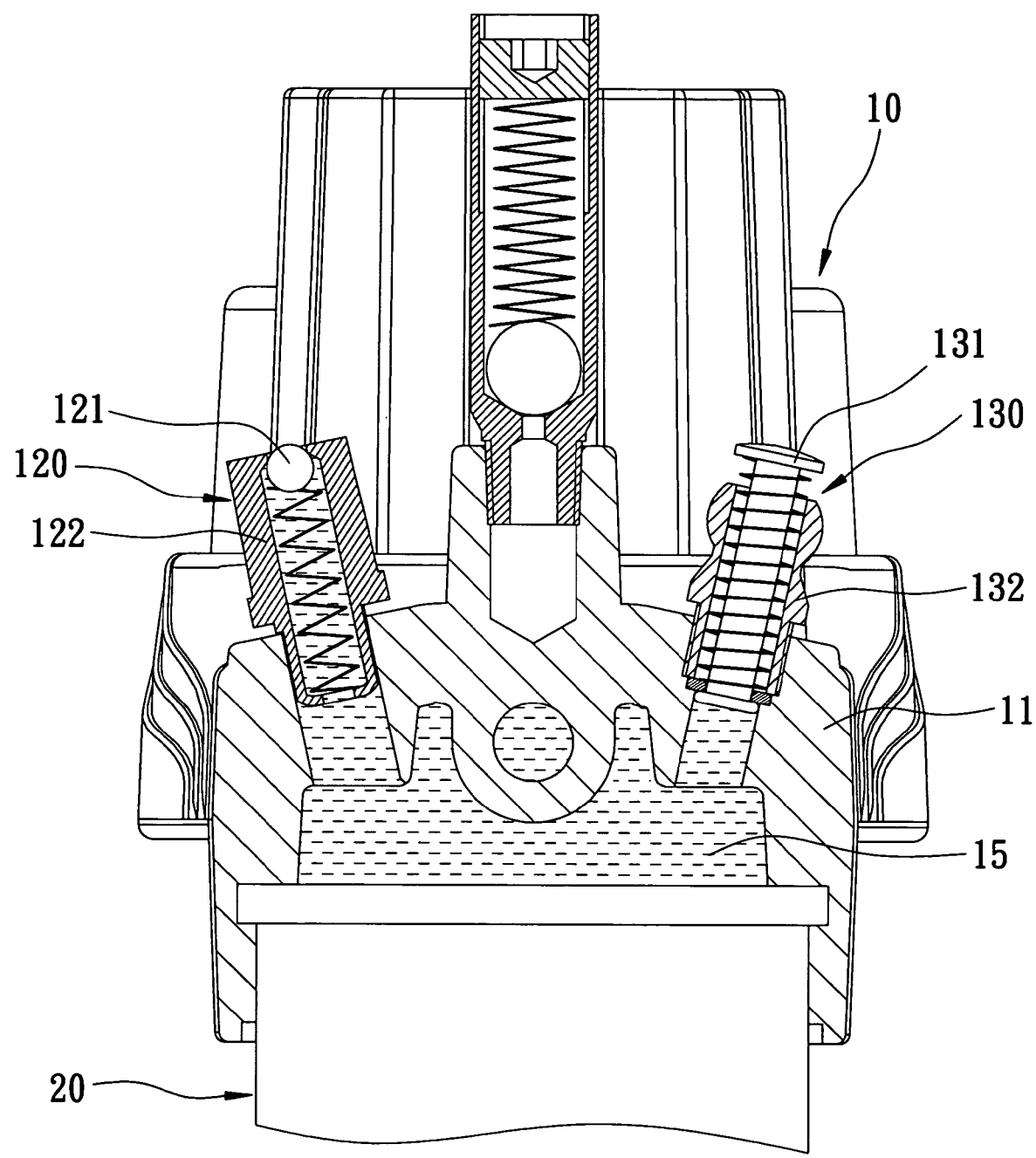
FIG. 16 is a schematic sectional view taken along line 16-16 of FIG. 15.

Referring to FIG. 16, the lubricant inlet 120 is provided on the front portion of the gun compartment 11 of the housing 10. The lubricant supply passage 15 is fluidly communicated with the slide channel 14. The lubricant reservoir 20 is fluidly communicated with the lubricant supply passage 15. The lubricant inlet 120 is fluidly communicated with the lubricant supply passage 15. When a steel bead 121 within the lubricant inlet 120 is pushed downwardly, the lubricant can be supplied into the lubricant reservoir 20 through a valve 122 of the lubricant inlet 120.

The exhaust valve 130 is mounted on the front portion of the gun compartment 11 of the housing 10, and is fluidly communicated with the lubricant supply passage 15. When a plug 131 of the exhaust valve 130 is pushed downwardly, gas within the lubricant supply passage 15 can be exhausted through a valve body 132 of the exhaust valve 130.

Figure 8:
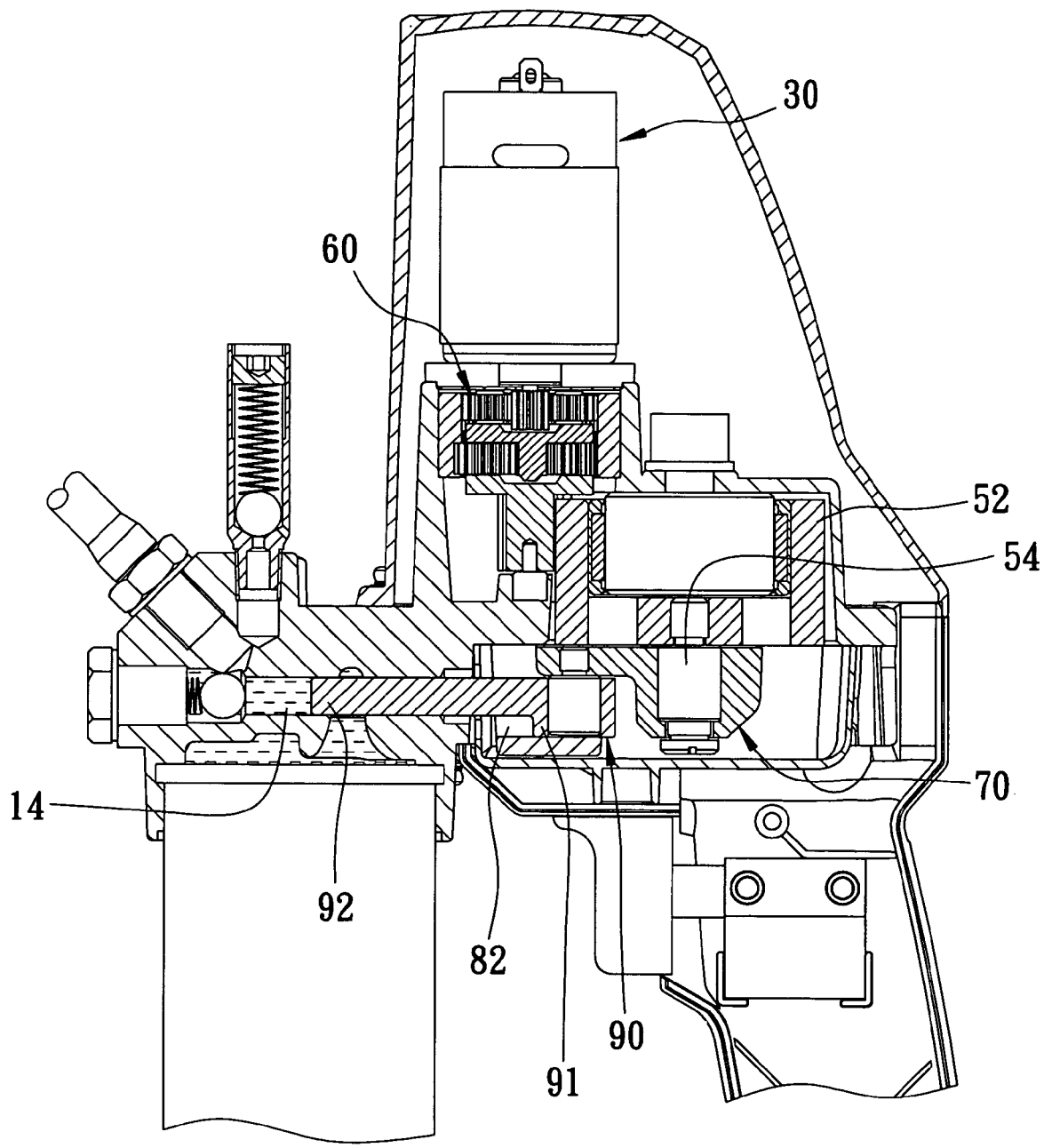
Figure 9:
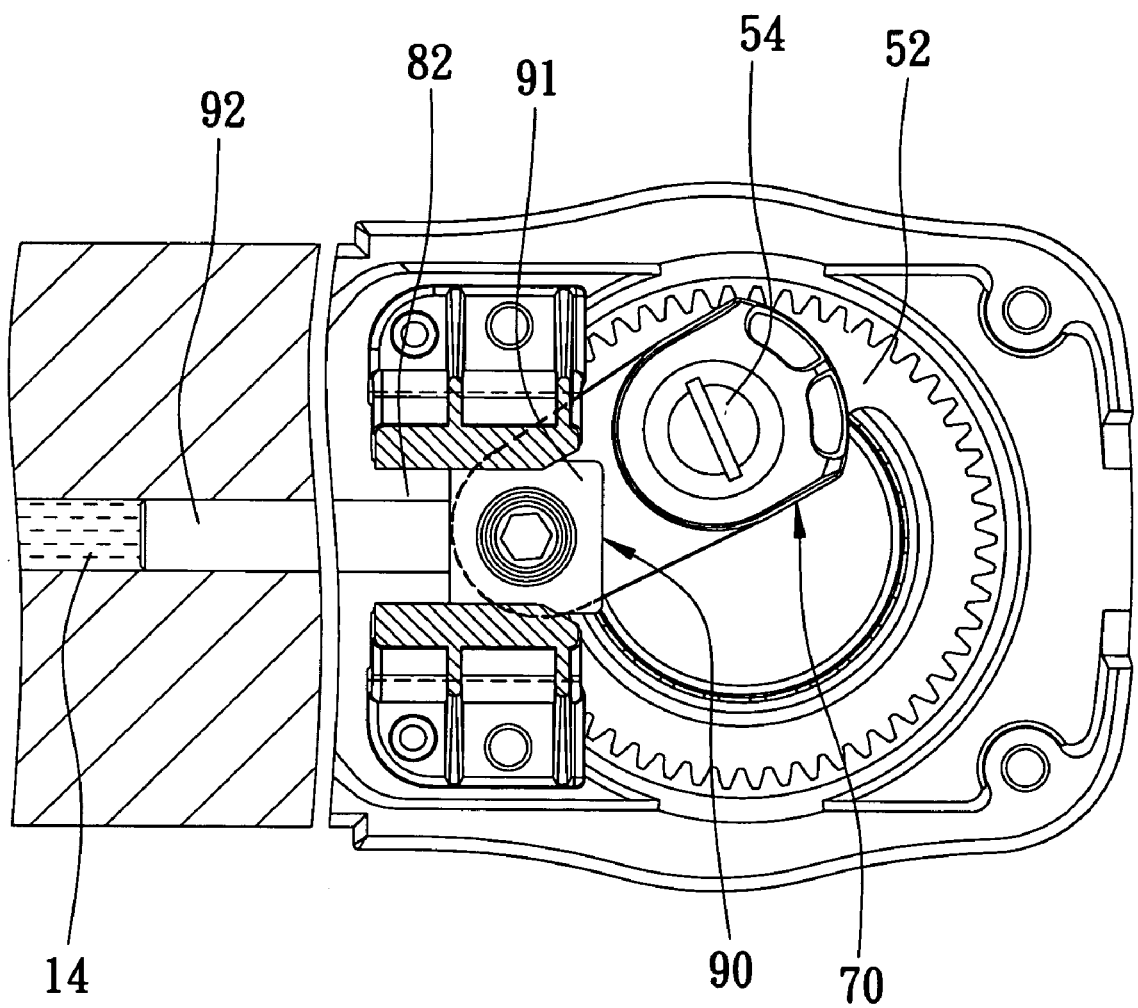
Figure 10:
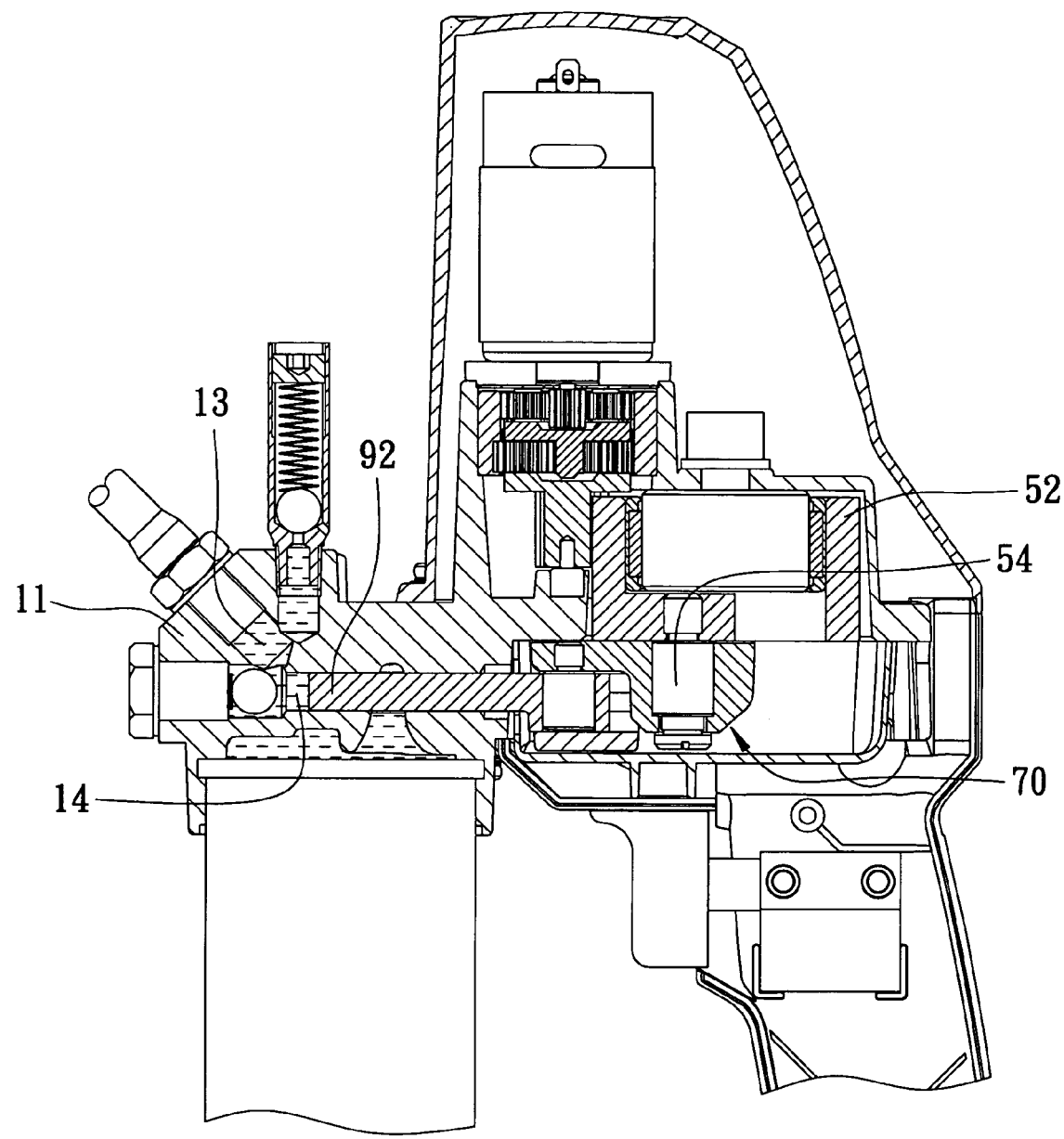
Figure 11:
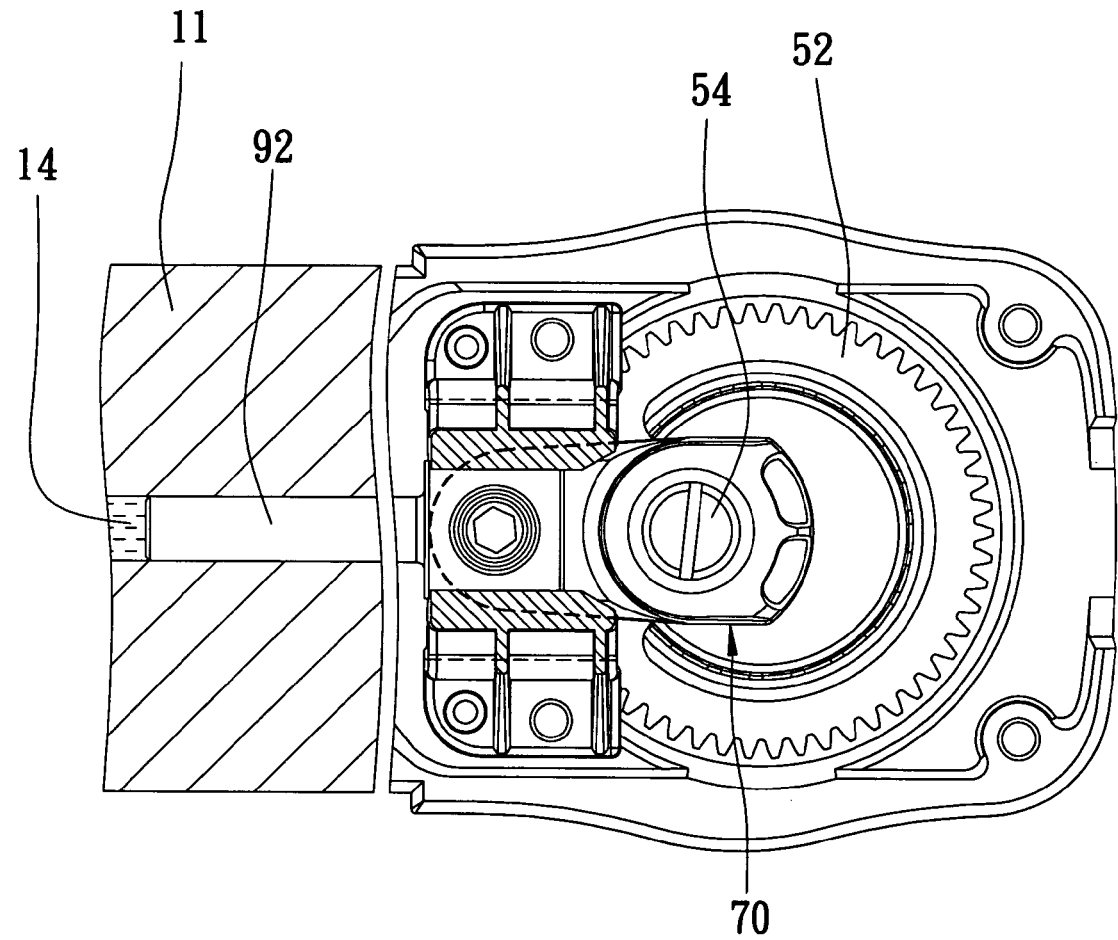

Referring to FIGS. 6 and 7, when the elongate eccentric seat 70 is moved to the right dead end position, the major part of the plunger 90 is pulled out of the slide channel 14. At this time, the guiding portion 91 of the plunger 90 extends into the first passage part 82 of the guide passage 85 so that the guiding portion 91 can be slidably received within and supported by the first passage 82 and that the second portion 72 of the elongate eccentric seat 70 also extends into the second passage part 83 of the guide passage 85. Referring to FIGS. 10 and 11, when the elongate eccentric seat 70 is being moved to the left dead end position from the right dead end position shown in FIGS. 6 and 7 via an intermediate state shown in FIGS. 8 and 9 so as to push the plunger 90 into the slide channel 14, the guiding portion 91 of the plunger 90 is confined within the first passage part 82 of the guide passage 85. Therefore, the plunger 90 can be activated smoothly by the elongate eccentric seat 70, and the tilting and deformation problem due to the torque encountered in the prior art can be avoided. The plunger 90 can be moved smoothly from the right dead end position to the left dead end position so as to discharge the lubricant via the discharge spout 13.

In view of the aforesaid, the following advantages over the prior art can be achieved by this invention:

1. As compared to the yoke 5 used in the conventional grease gun, the elongate eccentric seat 70 used in the lubricant gun of this invention is relatively light in weight. Furthermore, there is no friction between the gun compartment 11 of the housing 10 and the elongate eccentric seat 70. Therefore, the problems such as the shaking of the housing and the increase in the power load of the electric motor encountered in the prior art can be overcome.

2. The guiding portion 91 of the plunger 90 and the overlapping portion of the second portion 72 of the elongate eccentric seat 70 are always confined within and supported by the guide passage 85 during the reciprocating movement of the plunger 90 driven by the elongate eccentric seat 70. Therefore, the tilting, deformation and friction problems experienced in the prior art can be avoided.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A lubricant gun, comprising:
    a housing including a discharge spout, and a longitudinal slide channel arranged for fluidly communicating with said discharge spout;
    a lubricant reservoir connected to said housing for providing a supply of lubricant into said longitudinal slide channel;
    a motor mounted within said housing;
    a final driver rotatably mounted within said housing and arranged to be driven by said motor;
    an elongate eccentric seat mounted within said housing, and including a first portion connected eccentrically to said final driver, and a second portion opposite to said first portion;
    a guiding shroud disposed between said elongate eccentric seat and said slide channel within said housing, and defining a guide passage aligned longitudinally with said slide channel; and
    a plunger having a guiding portion pivotally mounted to said second portion of said elongate eccentric seat and slidably received in and supported by said guide passage of said guiding shroud, and a pushing portion received slidably in said slide channel,
    said guiding portion of said plunger being arranged to be guided by said guide passage of said guiding shroud when said plunger is driven by said elongate eccentric seat to reciprocate said guiding portion and said pushing portion of said plunger,
    said guiding portion of said plunger overlapping said second portion of said elongate eccentric seat and being pivoted to said second portion of said elongate eccentric seat where said guiding portion of said plunger and said second portion of said elongate eccentric seat overlap each other, said guide passage having first and second passage parts which are superimposed one upon the other, said first passage part being arranged for receiving said guiding portion of said plunger, said second passage part being arranged for receiving said second portion of said elongate eccentric seat, said second passage part being wider than said first passage part.

2. The lubricant gun as claimed in claim 1, wherein said guiding shroud includes two opposite side walls and a middle wall interconnecting said side walls, said side walls being stepped to define said first and second passage parts.

3. The lubricant gun as claimed in claim 1, wherein said second portion of said elongate eccentric seat is turnable about an axis of said first portion of said elongate eccentric seat, said first portion having an axial dimension larger than a dimension of said second portion along said axis of said first portion.

4. The lubricant gun as claimed in claim 1, further comprising a safety valve mounted on said housing and being arranged for fluidly communicating with said discharge spout for discharging the lubricant through said safety valve from said discharge spout when the pressure within said discharge spout is above a predetermined value.

5. The lubricant gun as claimed in claim 1, further comprising a lubricant inlet on said housing, and a lubricant supply passage arranged for fluidly communicating with said slide channel, said lubricant reservoir being arranged for fluidly communicating with said lubricant supply passage, said lubricant inlet being arranged for fluidly communicating with said lubricant supply passage.

6. The lubricant gun as claimed in claim 5, further comprising an exhaust valve mounted on said housing and being arranged for fluidly communicating with said lubricant supply passage.

7. A lubricant gun, comprising:
    a housing including a discharge spout, and a longitudinal slide channel arranged for fluidly communicating with said discharge spout;
    a lubricant reservoir connected to said housing for providing a supply of lubricant into said longitudinal slide channel;
    a motor mounted within said housing;
    a final driver rotatably mounted within said housing and arranged to be driven by said motor;
    an elongate eccentric seat mounted within said housing, and including a first portion connected eccentrically to said final driver, and a second portion opposite to said first portion;

a guiding shroud disposed between said elongate eccentric seat and said slide channel within said housing, and defining a guide passage aligned longitudinally with said slide channel;

a plunger having a guiding portion pivotally mounted to said second portion of said elongate eccentric seat and slidably received in and supported by said guide passage of said guiding shroud, and a pushing portion received slidably in said slide channel; and a power transmission mounted between said motor and said final driver, said guiding portion of said plunger is guided by said guide passage of said guiding shroud when said plunger is driven by said elongate eccentric seat to reciprocate said guiding portion and said pushing portion of said plunger, and wherein said final driver having a positioning shaft mounted within said housing, a gear member surrounding said positioning shaft, and a needle bearing mounted between said positioning shaft and said gear member, said first portion of said elongate eccentric seat being connected eccentrically and pivotally to said gear member, said motor having an output shaft extending toward said power transmission, said power transmission including a first sun gear mounted on said output shaft of said motor, an annular gear mounted within said housing, a first planet gear carrier, a first planet gear mounted on said first planet gear carrier and meshing with said first sun gear and said annular gear simultaneously, a second sun gear mounted under said first planet gear carrier, a second planet gear carrier pivotally mounted within said housing and proximate to said gear member, a second planet gear mounted on said second planet gear carrier and meshing with said second sun gear and said annular gear, and a driving gear mounted under said second planet gear carrier and meshing with said gear member, said motor, power transmission gear member, position shaft and elongate eccentric seat being arranged such that the rotation of said motor can be transmitted through said power transmission to rotate said gear member relative to said positioning shaft at a reduced speed so that said elongate eccentric seat can be activated by said eccentric shaft.

8. The lubricant gun as claimed in claim 7, further comprising a safety valve mounted on said housing and being arranged for fluidly communicating with said discharge spout for discharging the lubricant through said safety valve from said discharge spout when the pressure within said discharge spout is above a predetermined value.

9. The lubricant gun as claimed in claim 7, further comprising a lubricant inlet on said housing, and a lubricant supply passage arranged for fluidly communicating with said slide channel, said lubricant reservoir being arranged for fluidly communicating with said lubricant supply passage, said lubricant inlet being arranged for fluidly communicating with said lubricant supply passage.

10. The lubricant gun as claimed in claim 9, further comprising an exhaust valve mounted on said housing and being arranged for fluidly communicating with said lubricant supply passage.

* * * * *